US011832614B1

(12) United States Patent
Mansour et al.

(10) Patent No.: US 11,832,614 B1
(45) Date of Patent: Dec. 5, 2023

(54) **METHOD OF INHIBITING MYCOTOXIN GROWTH USING *ARTHROSPIRA PLATENSIS* NANOPARTICLES**

(71) Applicant: KING FAISAL UNIVERSITY, Al-Ahsa (SA)

(72) Inventors: Abdallah Tageldein Mansour, Al-Ahsa (SA); Ahmed Saud Alsaqufi, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/140,799

(22) Filed: Apr. 28, 2023

(51) Int. Cl.
*A01N 63/20* (2020.01)
*A01N 25/12* (2006.01)
*A23K 10/16* (2016.01)
*A23K 30/00* (2016.01)
*A01P 3/00* (2006.01)

(52) U.S. Cl.
CPC ............. *A01N 63/20* (2020.01); *A01N 25/12* (2013.01); *A01P 3/00* (2021.08); *A23K 10/16* (2016.05); *A23K 30/00* (2016.05)

(58) Field of Classification Search
None
See application file for complete search history.

(56) References Cited

U.S. PATENT DOCUMENTS

| 10,213,382 | B2 | 2/2019 | Brand |
| 2014/0326812 | A1 | 11/2014 | Dodd et al. |
| 2017/0202244 | A1 | 7/2017 | Calabotta et al. |
| 2018/0192670 | A1 | 7/2018 | Ariav et al. |
| 2019/0216106 | A1 | 7/2019 | Geistlinger et al. |

FOREIGN PATENT DOCUMENTS

| CN | 1104059 | A | * | 6/1995 |
| CN | 106318597 | A | * | 1/2017 |
| KR | 101557635 | B1 | | 10/2015 |
| WO | 20211255464 | A1 | | 12/2021 |

OTHER PUBLICATIONS

Ghamry, "Impending Chemotherapeutic Impact of Arthrospira platensis Nanoparticles and/or Sorafenib against Hepatocellular Carcinoma through Modulation of Antioxidant Status, Tumor Marker Genes, and Anti-Inflammatory Signaling Pathways", Toxics 2023, vol. 11, article 107, pp. 1-16 (Year: 2023).*
Kasmani et al., Biodetoxification of Aflatoxin B1 by Arthrospira platensis in Broilers, Journal of Applied Phycology, vol. 35, pp. 1193-1201 (Year: 2023).*
Sitotaw et al., "Ball milling as an important pretreatment technique in lignocellulose biorefineries: a review", Biomass Conversion and Biorefinery, https://doi.org/10.1007/s13399-021-01800-7, pp. 1-24 (Year: 2021).*
Mansour, A.T. et al., "The Using of Nanoparticles of Microalgae in Remediation of Toxic Dye from Industrial Wastewater: Kinetic and Isotherm Studies," Materials 15(11): 1922 (May 19, 2022).
Moreira, J.B. et al., "Microalgal Applications in Nanotechnology: An Outstanding Tool for Nanocompounds Synthesis and Bioproducts Obtention," Bioprospecting Algae for Nanosized Materials, pp. 95-116 (Feb. 27, 2022).
Mabrouk, M.M. et al., "Nanoparticles of Arthrospira platensis improves growth, antioxidative and immunological responses of Nile tilapia (*Oreochromis niloticus*) and its resistance to Aeromonas hydrophila," Aquaculture Research 53: pp. 125-135 (2022).
Sharawy, Z.K. et al., "Effects of dietary Arthrospira platensis nanoparticles on growth performance, feed utilization, and growth-related gene expression of Pacific white shrimp, *Litopenaeus vannamei*", Aquaculture 551:737905 (2022).

* cited by examiner

*Primary Examiner* — Michelle F. Paguio Frising
(74) *Attorney, Agent, or Firm* — Nath, Goldberg & Meyer; Richard C. Litman

(57) ABSTRACT

A method of inhibiting mycotoxin growth in a site susceptible to mycotoxin contamination, comprising obtaining a *Arthrospira platensis*, reducing the *Arthrospira platensis* to nanoparticles, and dispensing the *Arthrospira platensis* nanoparticles to the site susceptible to mycotoxin growth. In an embodiment, the site vulnerable to mycotoxin contamination is an animal feed supply. In an embodiment, the site susceptible to mycotoxin contamination is wastewater. Use of the *Arthrospira platensis* nanoparticles efficiently inhibits or prevents mycotoxin contamination.

17 Claims, No Drawings

METHOD OF INHIBITING MYCOTOXIN GROWTH USING *ARTHROSPIRA PLATENSIS* NANOPARTICLES

BACKGROUND

1. FIELD

The disclosure of the present patent application relates to methods of inhibiting mycotoxin growth, and particularly to methods of inhibiting mycotoxin growth using *Arthrospira platensis* nanoparticles.

DESCRIPTION OF THE PRIOR ART

Mycotoxins are toxins produced by fungi that are known to adversely affect the nutrition and health of humans and animals. The production of mycotoxins is the result of the natural biological process of fungi and has occurred over thousands of years. However, mycotoxin production has been influenced by climate change and changes in agricultural practices.

Mycotoxins are produced by a wide range of fungi including Aspergillus (Aflatoxin and Ochratoxin), Fusarium, (Zearalenone, Deoxynivalenol, Fumonisin) and Penicillium (PR toxin and Roquefortin). These toxins have a considerable pharmacological effect, even at very low concentrations (parts per billion), while toxicity may be further enhanced by metabolism in vivo, particularly by the liver.

Detoxification of most toxins occurs in the liver, while in the gastro-intestinal tract (GIT), under certain conditions, detoxification may also be achieved by microorganisms.

A large number of mycotoxins have been identified. Currently, there are five main groups of particular agricultural interest: the Aflatoxins, the trichothecenes (for example Deoxynivalenol), the Zearalenone group, the Fumonisins and the endophyte toxins.

Aflatoxins can cause growth reduction, suppressed immunity, reduced feed efficiency and increased mortality in cattle, among other symptoms. In pigs, reduced feed efficiency, increased mortality, and lower growth rates can be observed. In poultry, there are similar symptoms and a decreased ability to metabolize fat, protein and starch.

Zearalenone in cattle and pigs mimics oestrogen and produces a considerable reduction in reproductive performance, reduced growth, reduced milk production and reduced feed efficiency. In poultry, increased mortality is observed.

Deoxynivalenol (DON), an example of a trichothecene, causes severe symptoms in cattle, pigs and poultry, including gastric effects such as vomiting, reduced growth rates, reduced egg production, scours and reduced feed efficiency.

Fumonisin produces negative effects via a reduction in blood circulation and cardiac output, at least in part by agonizing sphingosine receptors. In this way they reduce growth and cause pulmonary edema in swine and poultry. This reduction of circulation affects all major organs including the liver and can exacerbate and enhance the effects of other toxins that may also be present.

Ochratoxin can be carcinogenic in humans and produces immunosuppression in farm animals.

Lolitrem B is an example of an endophyte toxin that produces a form of grass staggers, often confused with hypomagnesaemia.

Sporidesmin is an endophyte that causes facial eczema and liver damage in sheep.

Ergovalineis an endophyte toxin found in tall fescue, which reduces prolactin release and reduces blood flow.

Several mycotoxins, including aflatoxins, ochratoxins, and trichothecenes, among others, were isolated from animal feeds and feed ingredients, which were reported to induce growth retardation, immune suppression, oxidative stress, cancer development, and mortality.

Thus, compositions and methods to solve the aforementioned problems are desired.

SUMMARY OF THE INVENTION

In an embodiment, the present subject matter relates to methods of inhibiting mycotoxin growth in a site susceptible to mycotoxin contamination, comprising administering *Arthrospira platensis* nanoparticles to the site susceptible to mycotoxin contamination. In an embodiment, the *Arthrospira platensis* nanoparticles administered to the site susceptible to mycotoxin contamination have a particle size less than about 100 nm.

Accordingly, the present subject matter relates to methods of inhibiting mycotoxin growth in a site susceptible to mycotoxin contamination, comprising obtaining a culture of *Arthrospira platensis*; reducing the *Arthrospira platensis* culture to nanoparticle form to obtain *Arthrospira platensis* nanoparticles; and administering the *Arthrospira platensis* nanoparticles to the site susceptible to mycotoxin contamination.

In another embodiment, the present subject matter relates to methods of inhibiting mycotoxin growth in an animal feed supply, comprising administering *Arthrospira platensis* nanoparticles to the animal feed supply. In an embodiment, the *Arthrospira platensis* nanoparticles administered to the animal feed supply have a particle size less than about 100 nm.

Accordingly, the present subject matter relates to a method of inhibiting mycotoxin growth in an animal feed supply, comprising: obtaining a culture of *Arthrospira platensis*; drying the culture of *Arthrospira platensis* to obtain a dried culture of *Arthrospira platensis*; reducing the dried culture to nanoparticle form to obtain *Arthrospira platensis* nanoparticles; and administering the *Arthrospira platensis* nanoparticles to the animal feed supply.

In another embodiment, the present subject matter relates to a method of inhibiting mycotoxin growth in an animal feed supply, comprising: obtaining a culture of *Arthrospira platensis*; drying the culture of *Arthrospira platensis* to obtain a dried culture of *Arthrospira platensis*; grinding the dried culture of *Arthrospira platensis* to obtain *Arthrospira platensis* nanoparticles having a particle size less than about 100 nm; and administering the *Arthrospira platensis* nanoparticles to the animal feed supply.

These and other features of the present subject matter will become readily apparent upon further review of the following specification.

DETAILED DESCRIPTION

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

"Subject" or "patient" as used herein refers to any animal classified as a mammal, including humans, domestic and farm animals, and zoo, sports, and pet companion animals such as household pets and other domesticated animals such as, but not limited to, cattle, sheep, ferrets, swine or pigs, horses, camels, poultry, rabbits, goats, dogs, cats, and the like.

As used herein, the term "providing" an agent is used to include "administering" the agent to a subject.

As used herein, a "carrier" includes any and all solvents, dispersion media, vehicles, coatings, diluents, isotonic and absorption delaying agents, buffers, carrier solutions, suspensions, colloids, excipients, and the like.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to methods of inhibiting mycotoxin growth in a site susceptible to mycotoxin contamination, comprising administering *Arthrospira platensis* nanoparticles to the site susceptible to mycotoxin contamination. In an embodiment, the *Arthrospira platensis* nanoparticles administered to the site susceptible to mycotoxin contamination have a particle size less than about 100 nm.

In this regard, the present methods relate to inhibiting mycotoxin growth in a site susceptible to mycotoxin contamination, comprising obtaining a culture of *Arthrospira platensis*, reducing the *Arthrospira platensis* culture to *Arthrospira platensis* nanoparticles, and dispensing the *Arthrospira platensis* nanoparticles to the site susceptible to mycotoxin growth. In an embodiment, the site vulnerable or susceptible to mycotoxin contamination is an animal feed supply. In an embodiment, the site vulnerable or susceptible to mycotoxin contamination is wastewater. Use of the *Arthrospira platensis* nanoparticles efficiently inhibits or prevents mycotoxin contamination.

Accordingly, in one embodiment, the present subject matter relates to a method of inhibiting mycotoxin growth in animal feed, comprising obtaining a culture of *Arthrospira platensis*, reducing the culture of *Arthrospira platensis* to nanoparticles, and administering the *Arthrospira platensis* nanoparticles to the animal feed. Use of the *Arthrospira platensis* nanoparticles as a feed supplement against mycotoxins efficiently inhibits or prevents mycotoxin contamination of the animal feed. In addition to their use as anti-mycotoxin agents, *Arthrospira platensis* nanoparticles have numerous active components (essential amino acids, fatty acids, minerals, riboflavin, iron, carotenoids, pigments, and polysaccharides) which contribute to strong antioxidant and immunostimulant capacities for alleviating the negative effects of mycotoxins on animals and building a strong animal body and immune system to mitigate such stressors.

*Arthrospira* is a microalgae belonging to the cyanobacterium. It is a microorganism capable of fixing carbon dioxide through photosynthesis. It has a larger size and faster growth rate than other microalgae and can be used for food additives and health foods. *Arthrospira* contains antioxidants such as lipids such as polyunsaturated fatty acid (PUFA) and phycobiliproteins carotenoid, which is a pigment component.

In an embodiment, the culture of *Arthrospira platensis* or the dried culture of *Arthrospira platensis* is reduced to nanoparticles by grinding. In an embodiment, the culture of *Arthrospira platensis* or the dried culture of *Arthrospira platensis* is reduced to *Arthrospira platensis* nanoparticles by dry milling. In an embodiment, the *Arthrospira platensis* nanoparticles have an average size that is less than about 100 nm. For example, an average *Arthrospira platensis* nanoparticle size can range from about 50 nm to about 100 nm.

According to an embodiment, the *Arthrospira platensis* nanoparticles can be prepared by collecting an *Arthrospira platensis* culture, washing the *Arthrospira platensis* culture, drying the *Arthrospira platensis* culture, and grinding the dried *Arthrospira platensis* culture to produce the *Arthrospira platensis* nanoparticles. In an embodiment, the *Arthrospira platensis* culture can be dried in an oven at temperatures ranging from about 30° C. to about 40° C. The dried algae can then be ground to nanoparticle form by ball-milling using a planetary ball mill. The milling jar can be rotated at intervals of about 2 min. at a rotating speed of about 350 rpm for about 6 to about 8 hours.

The *Arthrospira platensis* nanoparticles can have a higher phytochemical composition content than *Arthrospira platensis* powders of greater particle size. In particular, *Arthrospira platensis* nanoparticles have a greater milbemycin and porphyrin content than *Arthrospira platensis* powders. Milbemycin administration via immersion or as a dietary supplementation did not induce any toxic effects on freshwater angelfish *Pterophyllum scalare*. Porphyrin is a molecule (macrocyclic tetrapyrrole) that has great biological functions, particularly in the photosynthesis process, chemical sensors, photodynamic therapy, energy conversion, photonics, oxygen transport and activation (haemoglobin and cytochrome, respectively), and the creation of novel macro-heterocyclic functional materials. For example, the content of milbemycin increased from 2% of the total phytochemical content in *Arthrospira platensis* powder to 66.68% of the total phytochemical content in the *Arthrospira platensis* nanoparticles. Milbemycin has several functions, such as wide spectrum antibiotic, anthelmintic, and immune modulation, which could improve the animal's health and survival.

It is believed that the change of the active components of *Arthrospira platensis* nanoparticles toward high antioxidant and antimicrobial activity can compete with the effect of mycotoxins within the animal as well as mitigate the growth of mycotoxin fungi in the animal feed. Also, as shown in Table 1, compared to *Arthrospira platensis* powder, *Arthrospira platensis* nanoparticles contain more docosanoic acid, 1,2,3-propanetriyl ester (fatty acid propanetriyl ester), with a peak area of (22.26%), and copper etioporphyrin II (metal porphyrin complex, with a peak area of (11.06%).

The capacity of *Arthrospira platensis* nanoparticles to adsorb other toxicants was confirmed previously when it was demonstrated that nanoparticles of *Arthrospira platensis* have a significant adsorption potential in the removal of Methylene Blue Dye from wastewater. The probable mechanism for the adsorption is chemisorption via surface-active charges, which is followed by physical sorption by occupying pores of *Arthrospira platensis*. The nanoparticulate form of *Arthrospira platensis* (sizes less than 100 nm) has a higher surface area than the bulk form (100 µml); therefore it follows that its adsorption capacity will be increased to bind and deactivate mycotoxins. Thus, it is believed that the *Arthrospira platensis* nanoparticles are more viable and have higher numbers of adsorption sites that could increase the binding affinity to mycotoxins.

TABLE 1

Phytochemical compounds of powder and nanoparticles of *Arthrospira platensis* NIOF17/003

| | RT | PA (%) | Phytochemical Compound | Nature |
|---|---|---|---|---|
| | | | Powder of *Arthrospira platensis* NIOF17/003 | |
| 1 | 16.812 | 41.66 | Nonadecane | Alkane Hydrocarbon |
| 2 | 19.296 | 4.17 | Trilinolein | Triacylglycerol |
| 3 | 20.071 | 1.00 | Astaxanthin | Carotene |
| 4 | 20.809 | 21.89 | Palmitic acid, methyl ester | Fatty acid methyl ester |
| 5 | 21.590 | 14.78 | Palmitic acid | Fatty acid |
| 6 | 23.711 | 2.04 | Docosahexaenoic acid, 1,2,3-propanetriyl ester | Fatty acid propanetriyl ester |
| 7 | 24.012 | 2.00 | Milbemycin B, 5-demethoxy-5-one-6,28-anhydro-25-ethyl-4-methyl-13-chloro-oxime | Macrocyclic lactones |
| 8 | 24.344 | 10.14 | Cholestan-3-ol, 2-methylene-, (3β,5α)- | Cholesterol |
| | | | Nanoparticles of *Arthrospira platensis* NIOF17/003 | |
| 1 | 16.89 | 22.26 | Docosanoic acid, 1,2,3-propanetriyl ester | Fatty acid propanetriyl ester |
| 2 | 19.32 | 11.06 | Copper etioporphyrin II | Metal Porphyrin Complex |
| 3 | 21.63 | 66.68 | Milbemycin B, 13-chloro-5-demethoxy-28-deoxy-6,28-epoxy-5-(hydroxyimino)-25-(1-methylethyl)-, (6R,13R,25R)- | Macrocyclic lactones |

*RT: L Retention time; PA (%): Peak area (%); Prob. (%): Probability (%); CF: Chemical formula; and MW: Molecular weight. Probabilities less than 10% have been omitted.
*The main phytochemicals of NAP were milbemycin B (66.68%), docosanoic acid, 1,2,3-propanetriyl ester (22.26%), and copper etioporphyrin (11.06%).

The following examples illustrate the present teachings.

EXAMPLES

Example 1
Nanoparticle Preparation

Pure *Arthrospira platensis* culture was collected, washed several times using distilled water, and dried in an air force oven (30-40° C.). Then, the dried algae were grinded to nanoparticle form by ball-milling using a planetary ball mill (Planetary Ball Mill PM 400 "4 grinding stations"). Briefly, in a milling jar, the algae powder was mixed with zirconium balls of 10 mm, the milling jar was rotated alternately in the forward or reverse direction at intervals of 2 min. at a rotating speed of 350 rpm for 6-8 hours. The resultant powder had particle sizes lower than 100 nm.

It is to be understood that the methods are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of inhibiting mycotoxins in a site susceptible to mycotoxin contamination, comprising:
    administering *Arthrospira platensis* nanoparticles to the site susceptible to mycotoxin contamination.

2. The method of claim 1, wherein the site susceptible to mycotoxin contamination is an animal feed supply.

3. The method of claim 1, wherein the *Arthrospira platensis* nanoparticles are prepared by a process comprising:
    obtaining a culture of *Arthrospira platensis*; and
    reducing the culture to nanoparticle form to obtain the *Arthrospira platensis* nanoparticles.

4. The method of claim 1, wherein an average size of the *Arthrospira platensis* nanoparticles is less than about 100 nm.

5. The method of claim 4, wherein an average size of the *Arthrospira platensis* nanoparticles ranges from about 50 nm to about 100 nm.

6. A method of inhibiting mycotoxins in an animal feed supply, comprising:
    administering *Arthrospira platensis* nanoparticles to the animal feed supply.

7. The method of claim 6, wherein the *Arthrospira platensis* nanoparticles are prepared by a process comprising:
    obtaining a culture of *Arthrospira platensis*;
    drying the culture of *Arthrospira platensis* to obtain a dried culture of *Arthrospira platensis*; and
    reducing the dried culture to nanoparticle form to obtain the *Arthrospira platensis* nanoparticles.

8. The method of claim 7, wherein the dried culture of *Arthrospira platensis* is reduced to nanoparticle form by grinding.

9. The method of claim 7, wherein the culture of *Arthrospira platensis* is dried in an oven at temperatures ranging from about 30° C. to about 40° C.

10. The method of claim 6, wherein an average size of the *Arthrospira platensis* nanoparticles is less than about 100 nm.

11. The method of claim 10, wherein an average size of the *Arthrospira platensis* nanoparticles ranges from about 50 nm to about 100 nm.

12. The method of claim 11, wherein the grinding comprises ball milling.

13. A method of inhibiting mycotoxins in an animal feed supply, comprising:
    administering *Arthrospira platensis* nanoparticles to the animal feed supply, wherein the *Arthrospira platensis* nanoparticles have a particle size less than about 100 nm.

14. The method of claim 13, wherein the *Arthrospira platensis* nanoparticles are prepared by a process comprising:
    obtaining a culture of *Arthrospira platensis*;
    drying the culture of *Arthrospira platensis* to obtain a dried culture of *Arthrospira platensis*;
    grinding the dried culture of *Arthrospira platensis* to obtain *Arthrospira platensis* nanoparticles having a particle size less than about 100 nm; and
    administering the *Arthrospira platensis* nanoparticles to the animal feed supply.

15. The method of claim 14, wherein the culture of *Arthrospira platensis* is dried in an oven at temperatures ranging from about 30° C. to about 40° C.

16. The method of claim 14, wherein the grinding comprises ball milling.

17. The method of claim 13, wherein an average size of the *Arthrospira platensis* nanoparticles ranges from about 50 nm to about 100 nm.

* * * * *